July 27, 1943.  J. S. SWEARINGEN  2,325,283
LUBRICATING SEAL
Filed Jan. 30, 1939  2 Sheets-Sheet 1

Inventor
JUDSON S. SWEARINGEN

July 27, 1943.  J. S. SWEARINGEN  2,325,283
LUBRICATING SEAL
Filed Jan. 30, 1939  2 Sheets-Sheet 2
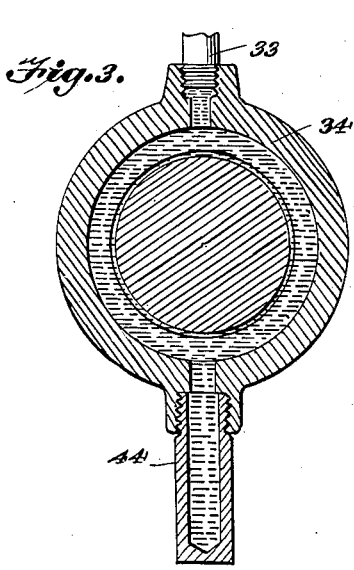
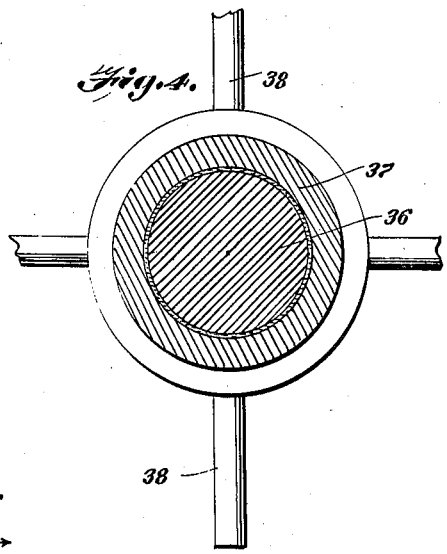
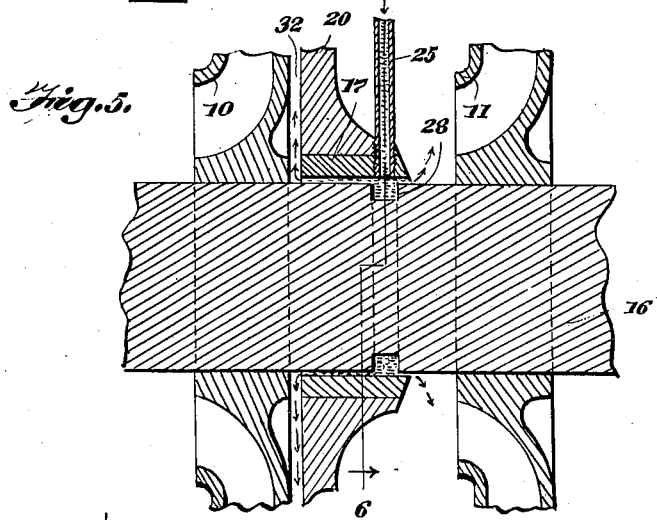
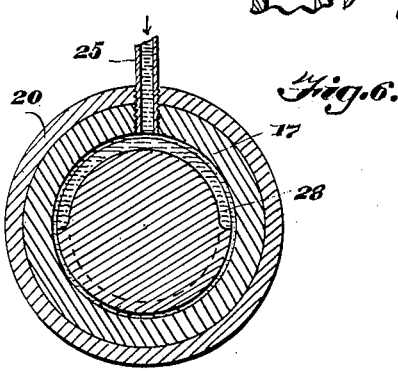
Inventor
JUDSON S. SWEARINGEN Patented July 27, 1943

2,325,283

UNITED STATES PATENT OFFICE 2,325,283

LUBRICATING SEAL

Judson S. Swearingen, San Antonio, Tex.

Application January 30, 1939, Serial No. 253,693

15 Claims. (Cl. 308—36.3)

This invention relates to the art of fluid compressors of the high speed centrifugal type, such as commonly employ multi-stage compression, wherein the fluid impeller means is carried by a driven shaft which projects through the end walls of the compressor casing and passes through wall means separating the various stages. In order to prevent pressure loss by leakage of the fluid being compressed axially back along the shaft from high to low pressure points, the shaft bearings must be sealed against such passage of fluid.

At relatively low speeds a shaft packing or stuffing box seal is generally sufficient, using either a dry lubricant, a viscous lubricant, or a very thin film of some limpid lubricant. At high speeds, however, such as 3,000 to 10,000 R. P. M. and higher, the resultant paucity of lubrication and small clearance between shaft and packing combined with high pressures cause rapid wear and heat generation which are immediately reflected in power loss and in bearing damage. These factors impose definite limits of operating speeds and output, even when external cooling systems are employed for well designed and adequately lubricated bearings when the speed is above 3,600 R. P. M.

It follows, therefore, that in order to obtain maximum efficiency at high speeds there must exist a very definite radial clearance between the shaft surface and its bearing, with no direct contact between shaft and bearing, and with a full film of lubricant separating the moving parts, filling the space therebetween and providing the entire support for the shaft. In such an organization the lubricant film seals the shaft against leakage of the compressor fluid either between the stages or at the casing ends. To this end the lubricant must be placed under such pressure that it will tend to flow through the bearing toward the high pressure side thereof.

It is an object of this invention to provide a means for imposing such a pressure upon the lubricant that it will flow through the bearing toward the high pressure side thereof, without employing a structure such as the ordinary stuffing box which would become inoperative under the high speeds and pressures contemplated by this invention.

It is a further object to provide such a means in which the effect of normal end play in the shaft of a machine of this type will be minimized to such an extent that it will not interfere with the proper operation of the bearing and sealing means.

Accordingly, an object of the present invention is to provide a structure which may be used in a high speed centrifugal fluid compressor or other comparable situation, which structure will include means for floating the impeller shaft in its bearings on a full film of a lubricant which serves also as a seal against the passage of the compressor fluid axially along the shaft.

Another object is to provide a novel shaft bearing assembly wherein the shaft, when operated under conditions above referred to including both high speed and high pressure, will be supported upon and entirely by a body of liquid lubricant maintained as a film completely separating the shaft and its bearing against any direct contact and completely filling the clearance therebetween.

Still another object is to provide a shaft bearing assembly in which the shaft, when operated at high speeds and pressures, is floated upon and entirely supported by a body of liquid lubricant maintained under pressure in the clearance between the shaft and its bearing, and having means for adjustably varying such clearance.

Another object is to provide a bearing and seal arrangement in which a lubricant is caused to flow continuously in opposite directions through spaced portions of the bearing while maintaining a film through the bearing, and in which the flow of such lubricant through the respective portions of the bearing may be regulated for maximum efficiency and effectiveness.

Other objects will become readily apparent to those skilled in the art.

While the instant disclosure constitutes an embodiment of the best means I have thus far devised for reducing the invention to practice, it is to be understood that within the scope of the invention as claimed any desired variations and substitutions may be made in structural details and arrangement of parts.

In the accompanying drawings, wherein like characters of reference designate like parts throughout the several views—

Figure 3 is a transverse section taken on the line 3—3 of Figure 2.

Figure 4 is also a transverse section taken on the line 4—4 of Figure 2.

Figure 5 is an enlarged fragmentary axial section through one of the inner stage bearing assemblies.

Figure 6 is a transverse section taken on the line 6—6 of Figure 5.

Figure 1:
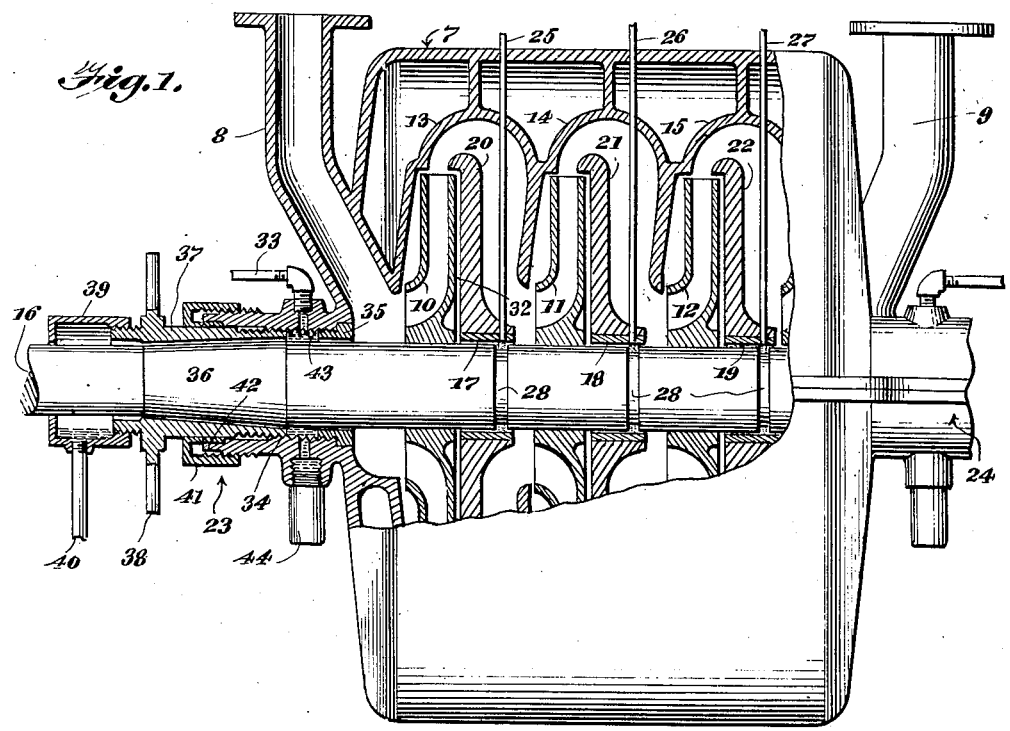
Figure 1 is an axial longitudinal section, partly in elevation, through a compressor equipped with the invention.

The invention is illustrated as applied to a familiar type of multi-stage centrifugal fluid compressor, such as a centrifugal gas pump, wherein the pump casing 7 is provided at its low pressure end with a fluid inlet 8 and at its high pressure end with an outlet or exhaust 9. The successive stages are defined by the respective impellers 10, 11 and 12 which discharge radially into their respective volutes or diffusors 13, 14 and 15. The impellers are fixed to the axially extending pump shaft 16 for rotation therewith, the shaft passing entirely through the pump in bearing bushings 17, 18 and 19 mounted axially in the fixed walls 20, 21 and 22 respectively which divide the stages in the conventional manner of such pumps. The inner end of the inlet conduit 8 opens in communication with the eye of the first stage impeller 10 and the discharge from the return passage from the first volute 13 opens to the eye of the succeeding or second stage impeller 11, and so on throughout the longitudinal extent of the pump, the final stage discharge being to the outlet conduit 9. At each end of the pump casing the shaft 15 extends through the end wall, being journalled in end bearings 23 and 24.

Lubricant is supplied to the inner bearings 17, 18 and 19 through supply conduits 25, 26 and 27 respectively, which are passed through the casing and the volutes and which discharge into annular lubricant reservoir grooves 28 provided in the shaft 16. Each groove is located near the high pressure end of its adjacent bearing.

As the pump fluid pressure in each stage is higher than that in the immediately preceding stage a corresponding variation in pressure is required in the individual oil circulating systems by which the different bearings are lubricated.

Figure 5 in connection with Figure 1 illustrates that a definite and appreciable clearance exists between the impeller shaft 16 and each of its bearings, the first stage bearing 17 only being shown in detail in Figure 5. This clearance should approximate one or two thousandths of an inch, which is appreciably larger than the minimum clearance requirement of one-half thousandth inch which machine design technology teaches is essential if full film lubrication is to be expected, assuming the appropriate lubricant is used. Oil of the proper viscosity, see Figure 5, is supplied to the bearing 17 under a pressure which is only slightly greater than the pump fluid pressure existing on the high pressure side of the first stage volute so that it is slowly forced from the ends of the bearing. The reservoir groove 28 is disposed as close to the high pressure end of the bearing as is practicable, and due to the relatively slight pressure differential at this end very little oil will be forced from the bearing. As the pump fluid pressure in the space 32 at the low pressure end of the bearing between the wall 20 and the back of the impeller 10 is less than that existing adjacent the eye of the second stage impeller 11, and less than the hydrostatic pressure on the oil supplied to the bearing, it is obvious that the greater part of the oil will flow axially through the bearing to discharge into the space 32, completely filling the clearance space between the shaft and bearing and presenting a body of liquid which renders impossible the leakage of pump fluid along the shaft from the zone of higher pressure to the zone of lower pressure as defined by the division wall 20.

The same relationship of parts and the operation as described in connection with the first stage bearing holds true with respect to the succeeding stages, so that it is unnecessary to repeat the description. The important factor in all is that the speed of rotation of the shaft 16 is sufficiently high to draw the oil into a full film upon which the shaft and its projected load is entirely supported, with no direct contact between shaft and bearing. The shaft is, in effect, floated upon a body of oil which flows slowly and continuously axially of the shaft during its service rotation, with the oil body completely filling the entire clearance space between shaft and bearing over the entire length of the bearing and thus sealing the shaft against leakage of pump fluid from higher pressure zones to lower.

The outside seal at the ends of the pump casing where the shaft extends through the casing ends is accomplished at the bearing assemblies 23 and 24 which are substantially identical. The assembly 23 is illustrated in detail in Figures 1 and 2 and its description will suffice for both.

The oil seal principle is the same as that for the inner bearings, oil being supplied through a feed line 33 to the inner end portion of a seal support member 34 carried by the adjacent end wall of the pump casing, and under a hydrostatic pressure which is slightly greater than the pump fluid pressure on the inner face of the end wall adjacent the eye of the first stage impeller 10. The member 34 is internally threaded and receives at its extreme inner end a bearing bushing 35 threaded thereinto and of but small axial extent, this bushing being of the same internal diameter as the inner bearings 17, 18 and 19. At a point spaced axially outward beyond the outer end of the bushing 35 the shaft 16 is formed with a slightly tapered reduced portion 36 which cooperates with a bushing 37 of complemental taper and which has its inner end externally threaded to take in the threaded bore of the member 34 so that by virtue of the ensuing threaded engagement when the bushing 37 is appropriately rotated it may be axially advanced or retracted with respect to the member 34 to vary the radial clearance existing between the tapered bushing and the tapered portion of the shaft. Hand lever means 38 are provided on the tapered bushing 37 as a means for effecting its adjustment, and threaded onto the outer end of the bushing is an oil collector 39 drained by an oil return line 40 by means of which the oil passed from the end of the bearing is recirculated through a system individual to the bearing and including the supply line 33 and pump means, not shown. Leakage of oil over the exterior of the bearing is prevented by means of a conventional stuffing box gland 41 in threaded engagement with the outer end of the member 34 and bearing against a packing 42.

The inner end of the tapered bushing 37 is spaced from the outer end of the cylindrical bushing 35 to provide an annular oil reservoir chamber 43 equivalent in function to the reservoir grooves 28 of the inner bearings, and communicating with the low point of this chamber is a sediment collector 44 which is removable for cleaning.

In this outer seal bearing assembly oil or other suitable liquid lubricant of proper viscosity is pumped through the feed line 33 into the reservoir chamber 43 at a pressure only slightly higher than that which exists at the inner end of the bushing 35. This keeps the chamber full of oil and maintains a perfect seal which prevents the egress of pump fluid outwardly along the shaft. At the same time some oil is forced out through the small bushing 35 into the pump inlet adjacent the first impeller where it may be removed with some pump fluid and separated out for further use or may be entrained with the pump fluid and be disposed of in some other way. The major body of oil flows axially outward along the shaft completely filling the clearance space and is received in the collector 39 from which it is drained for recirculation, as described. The shaft is, of course, rotated at a speed sufficient to maintain full film support of the shaft in the bushings.

Figure 2:
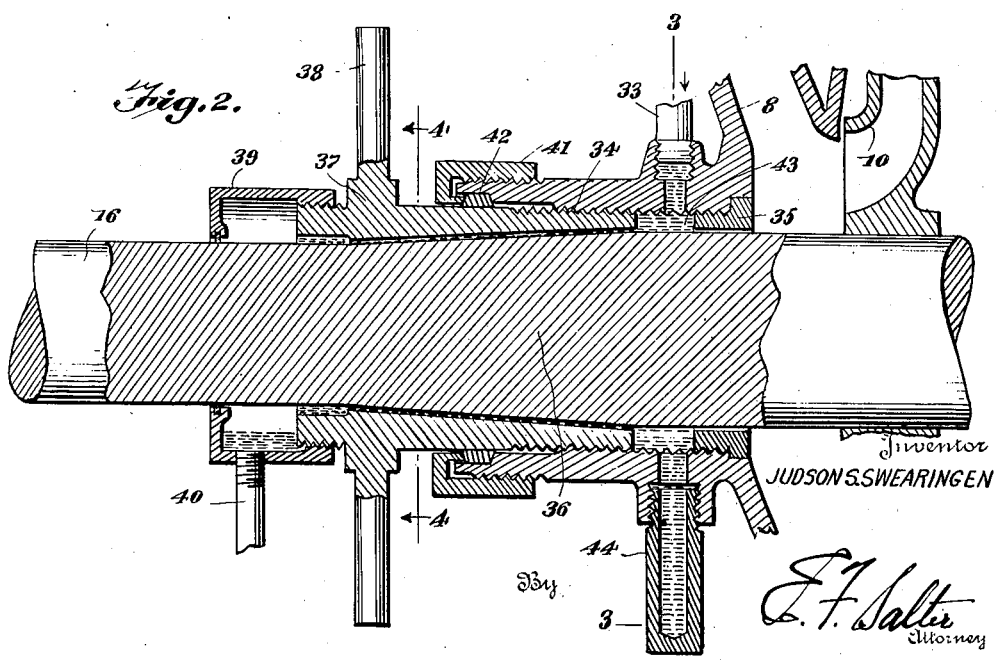
Figure 2 is an enlarged detail axial section, partly in elevation, of a bearing assembly, specifically that shown at the left of Figure 1.

In a compressor of the type herein disclosed it is difficult to prevent end movement of the impeller shaft resulting from thermal expansion, vibration and strains in various parts of the apparatus. It is essential to the proper functioning of the seal that the clearance between the shaft and bushings must be maintained substantially constant, and it would, therefore, seem on first consideration impractical to employ a conical bearing, and this would be so if it were not for the fact that in this invention the taper is made so gradual that the greatest possible end motion of the shaft will not change the seal clearance more than can be tolerated. The angle of taper as shown in Figures 1 and 2 is very greatly exaggerated for purposes of clarity in description. In actual practice I find a taper of ¼ to ½ degree between surface and axis to be most satisfactory.

In arriving at the proper degree of taper the limits of accuracy for the bushing-shaft clearance as well as the limits of shaft end play are precalculated and the taper is then made gradual enough to insure that the clearance tolerance is not exceeded.

Selection of a lubricant of proper viscosity, bearing clearance, and length of bearing are all important factors. The load on the bearing and the viscosity of the lubricant are inter-related with the speed of the impeller shaft, so there is a wide selection possible. As a general rule it may be stated that the product of the viscosity in centipoises and speed in R. P. M. divided by the projected bearing load in pounds per square inch should be greater than 3 in order to obtain full film lubrication.

In actual practice, operating a high speed multistage centrifugal gas pump equipped with this invention at a shaft speed of 7100 R. P. M. operating under a pressure of 1200 pounds per square inch, using a 2" seal 3" long with a radial shaft-bushing clearance of .00125 inch, only one quart of light lubricating oil leaked past the seal in 51 seconds. This indicates that the quantity of oil passed through the bearing clearance is smaller than might be expected and demonstrates clearly that the power requirement for returning the lubricant to the high pressure side, at high speeds such as 3,000 to 10,000 R. P. M. and higher, where the pressure is several hundred or several thousand pounds, compares most favorably with the power loss incurred when operating such machines at high speeds with no shaft-bushing clearance or with only an infinitesimal clearance, and proves the practicability and economic advantage of the invention. An economic balance is made possible between friction loss and lubricant pumping loss.

If a lubricant of 1.1 centipoise average viscosity is used, and that is about as limpid as is reliable, the pumping loss for returning the lubricant back to the high pressure side is equal to the friction loss within the oil film due to rotation for a seal two inches in diameter and 3 inches long running 7200 R. P. M. having a pressure differential of 1200 pounds per square inch across it when the film thickness is .001 inch. When these two losses are equal their total is a minimum. At this high speed the clearance cannot be reduced much below this .001 inch. To reduce it to ½ thousandth inch is permissible from a machine design standpoint but twice the heat would be generated and thermal expansion of the shaft would make its operation very critical.

This leads up to the summarizing statements that, for speeds of 3,000 R. P. M. up, seals require a lubricant of definite film thickness. The minimum practical film thickness is about one-thousandth inch. The minimum lubricant viscosity is about one centipoise. A balance between pumping loss for returning the lubricant back to the high pressure side and the friction loss within the lubricant film due to rotation of the shaft exists at about 400 pounds per square inch pressure drop per axial linear inch of bearing seal for a 2 inch shaft turning 7200 R. P. M. Higher speeds point to greater clearances. Greater pressure gradients point to lubricants of greater viscosity.

I claim:

1. In an apparatus having zones wherein different fluid pressures exist and partition means separating same, a shaft extending through said partition means into the zones and rotatable at a speed above 3000 R. P. M. to accomplish the function of the apparatus, a bearing for said shaft in the partition means, said shaft and bearing having a radial clearance therebetween when the shaft is rotated at its functional speed, and means maintaining the clearance space completely filled with a body of lubricant under a pressure not less than that existing in the zone having the higher pressure.

2. In an apparatus having zones wherein different fluid pressures exist and partition means separating same, a shaft extending through the partition means and rotatable at a speed above 3000 R. P. M. to accomplish the function of the apparatus, a bearing for said shaft in the partition means, said shaft and bearing having a radial clearance of .001 inch or greater therebetween when the shaft is rotated at its functional speed, means maintaining the clearance space completely filled with a body of liquid lubricant at a pressure not less than that existing in the zone of the higher fluid pressure, and said shaft when rotated at its intended functional speed being floated upon and entirely supported by the body of lubricant.

3. In an apparatus having zones of different fluid pressures divided by a partition, a shaft bearing in the partition, a shaft rotatable in said bearing and extending through the partition, said shaft and bearing having a radial clearance of more than .001 inch whereby to permit full film lubrication at a shaft speed of three thousand R. P. M. and higher, and means supplying a liquid lubricant to said bearing at a pressure greater than that existing in the zone of higher fluid pressure, whereby to seal the shaft.

4. In an apparatus having a shaft, a bearing therefor, and a liquid lubricant supplied thereto in a circulating system, said shaft and bearing having a radial clearance of not less than .001 inch, there being a value of ZN/P greater than 3, where Z represents the lubricant viscosity, N the R. P. M. of the shaft, and P the load on the bearing, and the intra-film friction loss of the lubricant being balanced by the power loss in circulating the lubricant.

5. In an apparatus having zones wherein different fluid pressures exist and partition means separating same, a bearing in said partition means, a shaft extending into the zones through said bearing and rotatable therein at speeds above 3000 R. P. M. to accomplish the function of the apparatus, there being a radial clearance of not less than .001 inch between said shaft and bearing over the entire length of the bearing, and a liquid lubricating medium continuously supplied to the bearing in excess of bearing requirements during functional speed rotation of the shaft whereby to maintain full film lubrication of the shaft and maintain the clearance space completely filled with the lubricant, and the lubricant being maintained under a pressure higher than that existing in the zone having the higher fluid pressure, the clearance, lubricant viscosity, bearing length and shaft speed being so defined as to approach a balance of power losses, namely, intra-film friction and volumetric leakage.

6. In a device of the character described having a partition separating zones adapted to be maintained at different pressures, the combination of a shaft passing through said partition, a bearing member supported in said partition and of a size to embrace said shaft with a fixed radial spaced relation thereto, a bearing member supported in said partition, and longitudinally spaced from said first bearing member and adjustable to vary the radial clearance between it and said shaft, the spaces between said bearing members respectively and said shaft being in communication with each other, means for supplying lubricant to both of said bearing members from the space between them, and means for adjusting said adjustable bearing member to vary the radial spacing between said adjustable bearing member and said shaft whereby lubricant flow through both of said bearing members may be varied.

7. In a device of the character described, in combination with a partition separating zones adapted to be maintained at different pressures and a rotatable shaft extending therethrough, a pair of longitudinally spaced radial journal bearings surrounding said shaft and carried by said partition, means for introducing between said bearings a lubricant under pressure greater than the pressure on the high pressure side of said partition to cause a flow of lubricant through both of said bearings around said shaft, and means for varying the radial clearances between said shaft and the bearing most remote from the high pressure side of said partition.

8. In a device of the character described, in combination with a partition separating zones of different pressures and a shaft passing through said partition, said shaft having a tapered zone thereon, a pair of longitudinally spaced radial journal bearings surrounding said shaft and carried by said partition, the one of said bearings most remote from the high pressure side of said partition comprising a bushing with the inner surface tapered to substantially fit the tapered zone on said shaft, means for introducing a lubricant under pressure between said bearings to cause lubricant to flow through both of said bearings in opposite directions, and means for adjusting said bushing longitudinally with respect to said shaft to vary the flow of lubricant through said bearings.

9. In a device of the character described, in combination with a partition separating zones adapted to be maintained at different pressures and a rotatable shaft extending therethrough, a pair of longitudinally spaced parts embracing and forming strictures around said shaft and carried by said partition, said shaft and embracing parts having sufficient radial clearance to permit full film lubrication at a shaft speed of 3000 R. P. M. and higher, means for introducing between the said embracing parts a lubricant under pressure greater than the pressure on the high pressure side of said partition to cause a flow of lubricant through both of said embracing parts around said shaft, and means for varying the radial clearance between said shaft and one of said embracing parts.

10. In a device of the character described, in combination with a partition separating zones adapted to be maintained at different pressures and a rotatable shaft extending therethrough, a pair of longitudinally spaced parts embracing said shaft and carried by said partition, one of said embracing parts providing a stricture and the other a journal bearing, the latter being most remote from the high pressure side of the partition, said shaft and embracing parts having sufficient radial clearance to permit full film lubrication at a shaft speed of 3000 R. P. M. and higher, means for introducing between said embracing parts a lubricant under pressure greater than the pressure on the high pressure side of said partition to cause a flow of lubricant through both of said embracing parts around said shaft, and means for varying the radial clearance between said shaft and the embracing part most remote from the high pressure side of said partition.

11. In a device of the character described, in combination with a partition separating zones adapted to be maintained at different pressures and a rotatable shaft extending therethrough, a pair of longitudinally spaced parts embracing and forming strictures around said shaft and carried by said partition, said shaft and embracing parts having sufficient radial clearance to permit full film lubrication at a shaft speed of 3000 R. P. M. and higher, means for introducing between said embracing parts a lubricant under pressure greater than the pressure on the high pressure side of said partition to cause a flow of lubricant through both of said embracing parts around said shaft, and means for adjusting the radial clearance between said shaft and the embracing part most remote from the high pressure side of said partition to such a degree that said last mentioned embracing part will act as a radial bearing for said shaft while still permitting a flow of lubricant through said embracing part to provide a complete oil film between said embracing part and said shaft.

12. In a device of the character described, in combination with a partition separating zones adapted to be maintained at different pressures and a rotatable shaft extending therethrough, a journal bearing surrounding said shaft and carried by said partition, additional means surrounding said shaft in spaced relation with respect to said journal bearing and of a size to provide an annular clearance between said member and said shaft, said shaft and the bearing and additional means surrounding the same having sufficient radial clearance to permit full film lubrication at a shaft speed of 3000 R. P. M. and higher, means for introducing between said bearing and said member a lubricant under pressure greater than the pressure on the high pressure side of said partition to cause a flow of lubricant through said bearing and said member around said shaft, and means for varying the radial clearance between said shaft and said member.

13. In a device of the character described, in combination with a partition separating zones adapted to be maintained at different pressures and a rotatable shaft extending therethrough, a part embracing and forming a stricture around said shaft and carried by said partition, means providing a chamber in communication with the end of said first embracing part which is most remote from the high pressure zone and including a second embracing part spaced from said first embracing part and surrounding but not in contact with said shaft, said shaft and embracing parts having sufficient radial clearance to permit full film lubrication at a shaft speed of 3000 R. P. M. and higher, means for introducing into said chamber a lubricant under pressure greater than the pressure on the high pressure side of said first embracing part to cause a flow of lubricant along said shaft in both directions from said chamber, and means for varying the amount of clearance between said second embracing part and the shaft.

14. In a device of the character described, in combination with a partition separating zones adapted to be maintained at different pressures and a rotatable shaft extending therethrough, a part embracing and forming a stricture around said shaft and carried by said partition, means spaced from said embracing part and surrounding said shaft and spaced from said shaft in all directions, said shaft and the embracing part and surrounding means having sufficient radial clearance to permit full film lubrication at a shaft speed of 3000 R. P. M. and higher, means for introducing a lubricant under pressure greater than the pressure on the high pressure side of said partition between said embracing part and the means spaced therefrom, and means for varying the space between said shaft and the said last mentioned means.

15. In a device of the character described, in combination with a partition separating zones adapted to be maintained at different pressures and a rotatable shaft extending therethrough, a part embracing and forming a stricture around said shaft and carried by said partition, means spaced from said embracing part on the side thereof which is most remote from the zone of higher pressure and surrounding said shaft out of actual contact therewith for limiting a flow of fluid from the direction of said embracing part along said shaft, said shaft and the embracing part and surrounding means having sufficient radial clearance to permit full film lubrication at a shaft speed of 3000 R. P. M. and higher, means for introducing a lubricant under pressure greater than the pressure on the high pressure side of said partition into the space between said embracing part and the means spaced therefrom and means for varying the resistance to flow of lubricant through said last mentioned means.

JUDSON S. SWEARINGEN.